Aug. 27, 1968  M. LASKIN  3,398,827
TRAYS, AND MULTI-TRAY PACKAGES
Filed Jan. 24, 1967  2 Sheets-Sheet 1
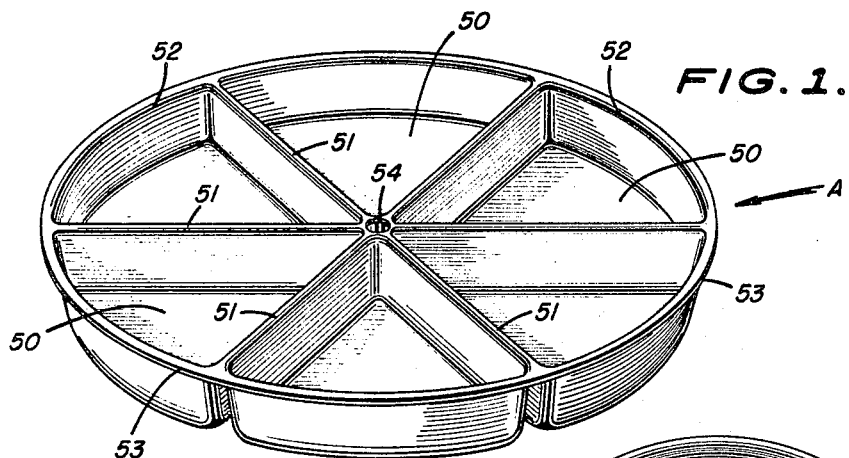
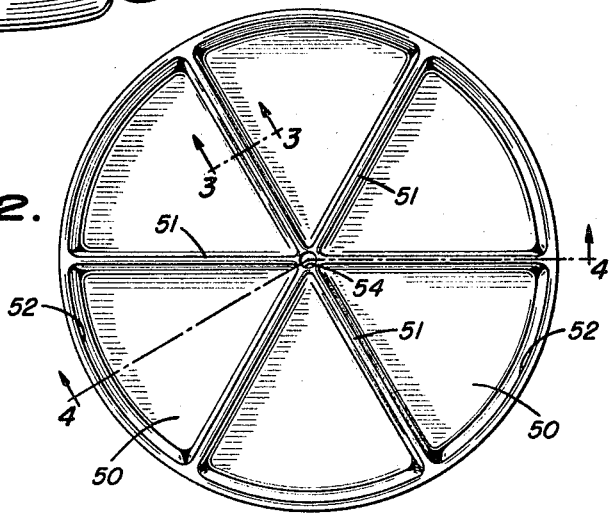
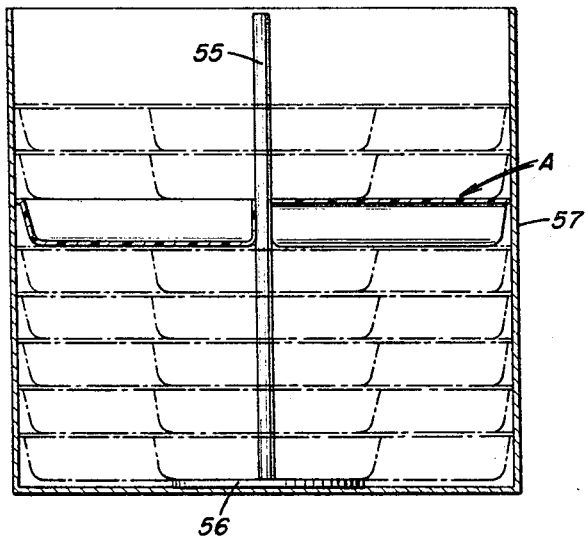
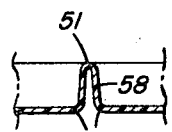
MAURIE LASKIN
INVENTOR Aug. 27, 1968   M. LASKIN   3,398,827
TRAYS, AND MULTI-TRAY PACKAGES
Filed Jan. 24, 1967   2 Sheets-Sheet 2
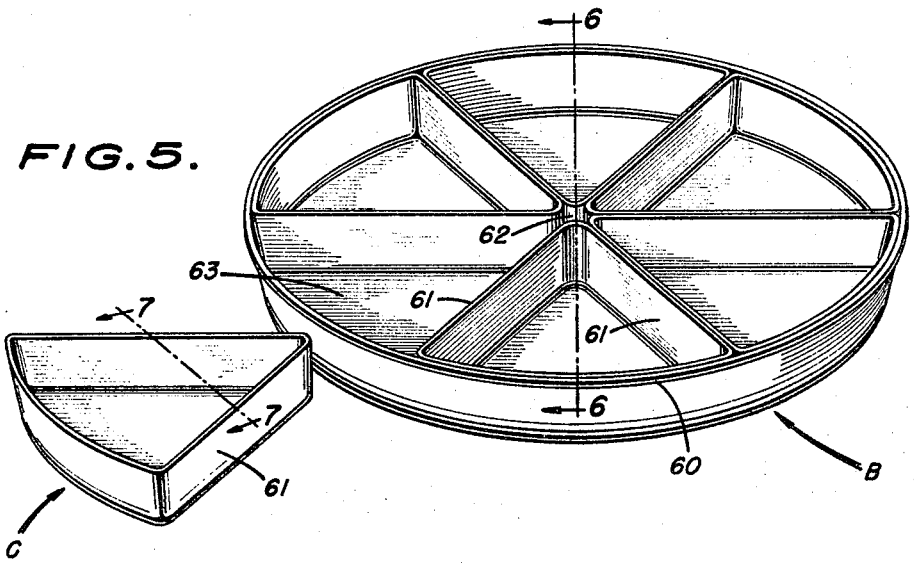
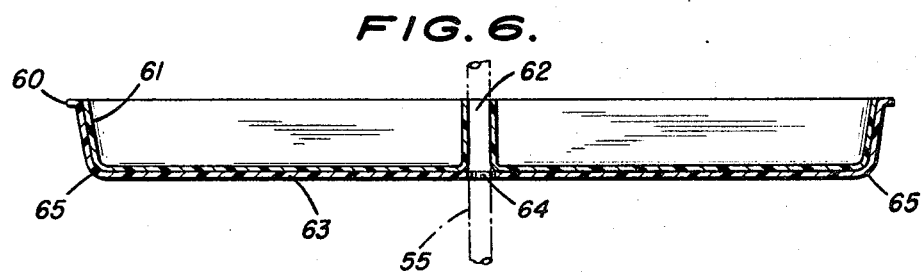
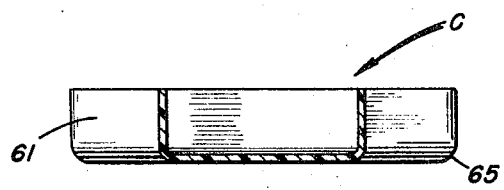
MAURIE LASKIN
INVENTOR United States Patent Office 3,398,827
Patented Aug. 27, 1968

3,398,827
TRAYS, AND MULTI-TRAY PACKAGES
Maurie Laskin, Milwaukee, Wis., assignor to W. R. Grace
& Co., a corporation of Connecticut
Filed Jan. 24, 1967, Ser. No. 611,379
8 Claims. (Cl. 206—65)

ABSTRACT OF THE DISCLOSURE

Multicavity, substantially circular, reusable product carrying trays which may be unitary, or comprised of assembled individual sectors; preferably having, in either case, a centrally located aperture or opening; and, multi-tray packages comprising an aligned stack of such multi-cavity trays on a base to which there is connected an arm passing axially through the stack to align the same and to serve as lifting and/or carrying means when desired.

---

This invention relates generally to throw-away or reusable unitary or assembled multi-cavity trays and multi-tray packages comprising a plurality of such trays. More specifically, this invention relates to substantially circular trays having a plurality of sector-shaped cavities therein and, preferably, a centrally located aperture or opening; and to multi-tray packages comprising an aligned stack of such circular trays.

A wide variety of article-carrying trays and packages for many purposes are known to the art. Exemplary of those suitable for use in forming and freeze molding of liquid products are the now very well known plastic ice cube trays. In recent U.S. Patent 3,261,530 (issued July 19, 1966) there is disclosed a generally sector-shaped plastic food container for sandwiches, pieces of pie and the like. In copending, commonly assigned application Ser. No. 611,276 of Kenneth W. Artz entitled "Trays" and filed concurrently herewith there is disclosed a multi-cavity tray design and construction useful for freeze molding and freeze drying of various fluent food substances. The freeze drying process, as such, as well as packaging uses for these multicavity trays is described and, where appropriate, claimed in my copending, commonly assigned application Ser. No. 611,317, entitled "Food Processing Method" and also filed concurrently herewith.

It is an object of this invention to provide new substantially circular multicavity trays which are adapted, among other things, for uses like those more fully described in my aforementioned application Ser. No. 611,317 entitled "Food Processing Method."

Another object of this invention is to provide multitray packages comprising an aligned stack of my new circular trays.

Still further objects and features of the invention as well as the advantages thereof will be more readily understood from the following more detailed disclosure, the appended claims, and the accompanying drawings which illustrate various embodiments of the invention.

In the drawings:

FIGURE 1 is a perspective view of one form of the invention showing a circular, unitary, plural cavity tray generally designated at A, adapted for marketing confectionary products.

FIGURE 2 is a top view of a plural-cavity tray like that of FIGURE 1, having a central aperture or opening therethrough to facilitate stacking of a number of trays.

FIGURE 3 is a partial cross-sectional view taken on line 3—3 of FIGURE 2.

FIGURE 4 is a view in section of a stack of circular, plural cavity trays assembled on an axial aligning and lifting arm and placed in a packing container, with tray A shown along line 4—4 of FIGURE 2.

FIGURE 5 is a view in perspective of a second embodiment of the invention, showing individual sector-shaped cavities generally designated at C, fitted into a circular retaining container, generally designated at B.

FIGURE 6 is a cross-sectional view taken on line 6—6 of FIGURE 5.

FIGURE 7 is a cross-sectional view taken on line 7—7 of FIGURE 5.

Referring to FIGURES 1 and 2 there is shown a plural cavity tray, generally designated by letter A, having a plurality of similar tray cavities 50 within the peripheral, substantially circular, boundary wall 52. The upper contiguous edges of adjacent cavities are integrally joined to form radial ribs or webs 51 which contribute greatly to the structural strength of the tray. At the central common point of intersection of the radial ribs or webs, there is, preferably, an aperture 54. The opening 54 can be made at any desired time, e.g., when the tray is produced or at any later time. As shown, the tray also includes a peripheral flange 53 extending generally laterally from the wall 52.

In FIGURE 4 there is shown a stack of the trays of FIGURES 1 and 2 having an arm 55 extending through the axially aligned apertures 54. This arm 55 is connected to an enlarged base 56, thus permitting lifting and carrying of the stack where desired. Furthermore the consumer can then easily remove one or more desired trays by slidably lifting off of the arm 55. The stack of trays can be packaged in an outer container 57 to facilitate handling prior to use and consumption.

In FIGURE 3 it is seen that radial cavity walls 58 extend to substantially the same height as the outer boundary wall 52 and have rounded bottom 59.

Another embodiment of the present invention is shown in FIGURE 5. In this embodiment, there is a circular retaining container, generally designated by the letter B. A plurality of individual sector-shaped cavities designated generally by the letter C are placed in the retainer B. The retainer B and individual cavities C are designed so that there is a central open space at 62 to afford passage of a lifting and stacking arm 55 for purposes previously described with respect to similar arm 54. The outer rim 63 of the retainer B has a peripheral flange 60. As best seen in FIGURE 6 there is the hole cut in the bottom of the retainer B at 64. The arm 55 is shown in phantom to illustrate how it can be inserted to facilitate stacking two or more molds. Also best seen in FIGURE 6 are the rounded connecting portions 65 in the retainer B and the cavity C. This feature is also seen in FIGURE 7, with respect to the cavity C.

The trays of this invention may be formed from any suitable material such as metal foil, plastic, cellophane, paper pulp, plastic coated paper and the like. The prime criteria for determining the material of construction are the final intended use, and the physical characteristics desired for such use, i.e., strength, rigidity, flexibility, etc. When the intended use is to mold fluent (liquid or flowable plastic-like) food materials for subsequent freezing and freeze drying the unitary trays A and at least the individual sector cavities C are most preferably made of thermoplastic materials approved for food uses, including for example, such thermoplastics as polyethylene, polypropylene, polystyrene, polyvinyl acetate and other like thermoplastic materials. A most particularly preferred material of construction is biaxially oriented polystyrene sheet material about 10 to 15 mils (.010 to .015 inch) thick. Such trays may be manufactured by use of generally well known forming procedures including, in the case of thermoplastics, the vacuum forming, pressure forming or mechanical forming procedures generally described in the September 1959 issue of Package Engineering ("Oriented Polystyrene Sheets Part II—Thermoforming Cycle, etc." by Merlin L. Evans) and more specifically described in a number of published patents and other literature. In the multi-cavity tray assembly shown in FIGURE 5 the retainer B may also be formed of a thermoplastic material such as oriented polystyrene, or may be of any other suitable material, e.g., cardboard, paper pulp, etc.

The lifting and aligning assembly comprised of base 56 and arm 55 (e.g., FIGURE 4) may be formed also of plastic (either thermoplastic or thermosetting) or of virtually any other material having suitable strength characteristics, e.g., wood, metal, etc. This assembly may be of unitary construction or made in two separate pieces which are suitably connected together for use. The material of construction for the outer container 57 which may be used to facilitate handling of the stacked multi-tray package of this invention is not critcal. Usually it will be either cardboard or plastic.

The multi-cavity trays of this invention may be machine or hand filled with liquid or congealable contents or with preformed individual sector-shaped solid articles; in particular, sector-shaped confectionery pieces, such as chocolate covered confectionery pies.

The trays, with contents, are capable of being dispensed from dispensing machines. Furthermore, the circular trays may be stacked with others, and packaged in bulk in a cylindrical packing case for consumer sales, as illustrated in FIGURE 4. Preferably such bulk packages include the lifting and aligning assembly 55, 56 to facilitate removal of each circular tray and the individual cavity tray contents by the consumer, while permitting ease of storage.

The trays of this invention serve as a handling covering when eating the contents such as a chocolate-covered freeze-dried ice cream pie. The confectionery or other product within the tray cavities is also easily removed, if desired, by a slight manual deformation operation. The tray may be thrown away after a single use or reserved for reuse by the housewife.

The various forms and characteristics of the trays described have home, commercial, and industrial use. Such features enable economical production of the tray, economical storage thereof without destruction, and economical filling of the tray cavities to be machine or hand dispensed.

It is to be understood that variations in material, shape, capacity, gauge, methods of production, filling, using, and selling of the invention may be resorted to without departing from the spirit of the invention as described and from the scope of the appended claims. For instance, thin gauge aluminum which can be pressure formed, or plastic laminates can be used as the tray material. Moreover the trays can contain any desired number of individual cavities 50 (or sectors C), for example, from 4 to ten such cavities (or sectors) including the six cavity trays which are illustrated. Also, the individual cavities of my invention need not be sector-shaped. They can obviously be formed in any decorative pattern, such as hearts, spades, clubs, diamonds, novelty objects, and other decorative designs. It is clear that the only limitation is that the cavities must be fitted into the basic sector-shape of the circular tray.

It is also understood that the individual or plural cavity tray may be used for receptacle or storage purposes regardless of casing, handling, or wrapping function and that economy in production permits discarding thereof after use despite reusability thereof. Thus, great savings in packaging and handling can be effected in, say, convenient snack items in the frozen food field.

It should be appreciated that the trays of this invention may be used for handling of preformed products including candies and chocolates. The trays can also be used to receive any congealable substance which can then be solidified in the cavities, such as mixtures for making ices and ice cream, custards, gelatin, and the like. These and other features of the invention lend it to wide use in transportation, commercial, domestic, and industrial fields.

What is claimed is:
1. A one-piece tray container comprising:
   a substantially flat bottom wall having a generally circular periphery;
   a peripheral side wall extending upwardly from the bottom wall and intergally connected to substantially the entire periphery of the bottom wall;
   a peripheral flange extending outwardly around the upper part of the side wall, substantially on a plane parallel to the bottom wall;
   a plurality of inverted substantially U-shaped ribs of the same height as the side wall, integrally connected at their side ends to said side wall and at their outer top ends to said peripheral flange, and extending radially inwardly from the side wall toward the center of the tray to a point slightly spaced from the center of the tray so as to form a small opening through the tray at about its center, the end of each such rib being integrally connected with the like ends of adjacent ribs;
   the lower open longitudinal sides of each inverted U-shaped rib being integrally connected throughout their length to adjacent portions of the bottom wall to form a plurality of spaced apart pockets in said tray for carrying product placed therein.

2. A tray container as described in claim 1, in which the inverted substantially U-shaped ribs are equiangularly spaced apart.

3. Multi-tray package comprising an aligned stack of multi-cavity trays as defined in claim 1 with the pockets of each tray in the stack facing in an upward direction, an arm extending axially through all of the aligned center openings of the trays in the stack, and a base substantially larger than the said center openings and connected to the end of said arm below the bottom wall of the lowermost tray in said stack.

4. Multi-tray package as defined in claim 3 further comprising an outer container surrounding at least the base end and the sides of said stack.

5. A tray container assembly comprising:
   a retainer tray having a substantially circular bottom wall and an upstanding side wall around its entire periphery;
   a peripheral flange extending outwardly around the upper part of the side wall, substantially on a plane parallel to the bottom wall;
   a small centrally located aperture through the thickness of the bottom wall of the retainer tray;
   a plurality of individually removable product carrying cavities within said retainer tray each having a sector-shaped bottom wall, the two straight sides of which have a length slightly less than the radius of the bottom wall of the retainer tray, and upstanding straight side walls around the entire periphery of and integrally connected with the bottom walls having the same height as the retainer tray side wall;
   the sum of the sector angles of the plural individually removable product-carrying cavities equalling substantially 360°.

6. Multi-tray package comprising an aligned stack of multi-cavity tray assemblies as defined in claim 5 with the plural cavities of each tray in the stack facing in an upward direction, an arm extending axially through all of the aligned center openings of the retainer trays in the stack, and a base substantially larger than the said center openings and connected to the end of said arm below the bottom wall of the lowermost retainer tray in said stack.

7. A tray container assembly as described in claim 5 in which the sector angles of each of the cavities are substantially the same.

8. Multi-tray package as defined in claim 6 further comprising an outer container surrounding at least the base end and the sides of said stack.

References Cited

UNITED STATES PATENTS

| | | | |
|---|---|---|---|
| 1,526,397 | 2/1925 | Thornton | 220—23.2 |
| 1,527,386 | 2/1925 | Barnard | 206—44 |
| 2,339,475 | 1/1944 | Hartsell et al. | 206—59 |
| 2,409,279 | 10/1946 | Hiller | 220—97 |
| 2,700,284 | 1/1955 | Lyon | 220—23.8 |
| 2,703,185 | 3/1955 | Cook | 220—23.8 |

WILLIAM T. DIXSON, JR, *Primary Examiner.*